United States Patent [19]

Chahal et al.

[11] Patent Number: 4,525,741
[45] Date of Patent: Jun. 25, 1985

[54] SELF-ADJUSTING VIDEO CAMERA

[75] Inventors: Maninderpal S. Chahal, Kitchener; Roger H. Therrien, Waterloo, both of Canada

[73] Assignee: NCR Corporation, Dayton, Ohio

[21] Appl. No.: 438,826

[22] Filed: Nov. 3, 1982

[51] Int. Cl.³ .............................................. H04N 1/40
[52] U.S. Cl. .................................... 358/212; 358/209; 358/280; 358/174
[58] Field of Search ............... 358/209, 213, 212, 169, 358/168, 171, 174, 294, 167, 280

[56] References Cited

U.S. PATENT DOCUMENTS

| 3,800,078 | 3/1974 | Cochran et al. | 358/167 |
| 3,872,434 | 3/1975 | Duvall et al. | 340/146.3 |
| 3,911,467 | 10/1975 | Levine et al. | 357/24 |
| 3,952,144 | 4/1976 | Kolker | 178/6 |
| 3,995,107 | 11/1976 | Wovwood | 358/213 |
| 4,129,853 | 12/1978 | Althauser et al. | 340/146.3 |
| 4,167,754 | 9/1979 | Nagumo et al. | 358/167 |
| 4,216,503 | 8/1980 | Wiggins | 358/280 |
| 4,388,526 | 6/1983 | Schroeder | 250/214 |
| 4,392,123 | 7/1983 | Brüggemann | 340/347 AD |
| 4,402,016 | 8/1983 | Muller | 358/280 |

Primary Examiner—Gene Z. Rubinson
Assistant Examiner—Robert Leu
Attorney, Agent, or Firm—J. T. Cavender; Casimer K. Salys; T. Rao Coca

[57] ABSTRACT

Disclosed is an automatic self-adjusting CCD activated video camera circuit for adjusting the various CCD channel offset and gain values to the desired levels by utilizing the channels' digitized internal black and white references. Two identical feedback loops are used for offset and gain adjustment, respectively. In the gain/offset adjust loop, the white/black reference is compared to a desired gain/offset set by jumpers or switches on the video camera board. A difference in these values causes a corresponding 10 bit counter to increase or decrease its value. The digital counter value is converted to an analog signal and is used to optimally modify the channel gain/offset.

18 Claims, 5 Drawing Figures

SELF-ADJUSTING VIDEO CAMERA

BACKGROUND OF THE INVENTION

This invention relates to a solid state video camera which uses a semiconductor element, for example, a charge coupled device, as an image sensor, and more particularly, is directed to a solid state video camera, as aforesaid, which has an automatic processing circuit to generate a high quality image.

Solid state video cameras which use charge coupled devices (hereafter CCDs) as image sensors are well-known. The most recently developed cameras, due to their capability of operating at low light levels and providing a high resolution, have been applied to a wide range of industrial applications, including facsimile transmission, automatic optical character recognition, bar-code reading and robotics. Other applications presently being contemplated include industrial measurement and inspection of such products as hot steel, sheet surfaces, and even processing (i.e. sorting) vegetables.

A CCD image sensor, as is known in the prior art, typically includes a silicon substrate covered by an insulating layer such as silicon dioxide and having thereon an array of closely-spaced gate electrodes formed from, for example, doped polysilicon material. The gate electrodes are interconnected in rows or columns, which are electrically connected to both a CCD address circuit for sequentially applying gate electrode voltages, and to a data readout register.

When a CCD is used as an imaging device, light reflected from the object to be imaged, e.g. a document, is projected on the CCD. This luminous energy generates a corresponding pattern and number of charge carriers in the bare areas of silicon (invariably called photosites, picture elements or pixels) as explained below. During the so-called integration time, which is analogous to the exposure time in conventional cameras, the CCD address circuit applies voltages to the gate electrode array to provide a pattern of potential wells which attract charged minority carriers. A charge pattern will form in the potential wells under the various photosites nearest to where the charges are produced. The number of charge carriers which accumulate in each potential well during the integration time is proportional to the amount of light reaching that well and this, in turn, is proportional to the light intensity and the duration of the integration time. Thus, a spatial pattern of charge carriers corresponding to an optical image is produced by the CCD.

The above CCD image sensor uses an area sensor consisting of a matrix of photosensors addressed in two-dimensional coordinates by decoders or shift registers so as to select each individual element in turn and read out its charge. Area sensor CCDs having as many as 380 columns of 488 photosites are now available. However, because of various limitations, this approach has not been popularly accepted.

Another approach is to use a CCD imager that senses a single line. This linear sensor consists of a single row of sensors and it may be used in a two-dimensional sense by using a mechanical scanner such as a rotating mirror or moving the object to be scanned in front of the sensor.

Regardless of whether the CCD image sensor is a matrix arrangement or a linear array, the image is typically read out from the sensor as one or more separate fields or channels. For example, in a dual channel linear array CCD image sensor all the odd-numbered photosensor elements are connected together constituting one channel and all the even-numbered photosensor elements are connected together constituting the second channel. Each of these channels in the dual channel CCD image sensor contains an internal black reference and white reference and only one-half of the projected graphical image information thus requiring appropriate interlacing of the two channels to obtain the full image. For a detailed description of CCD interlacing techniques, reference is made to U. S. Pat. No. 3,911,467, issued to Levine et al.

Each channel of a multi-channel CCD image sensor is provided with an output analog amplifier which is adjusted to the required offset and gain values dictated by the CCD manufacturer tolerances, illumination variations, integration time, etc. As a result of these variations, an imbalance between the channels may occur introducing unwarranted distortion and artifacts in the image signals generated by the CCD array resulting in erroneous or unsatisfactory imaging of the object.

One way of solving this problem is by means of gain and offset circuits having manual gain and offset adjustment potentiometers to achieve a balanced condition between the two output levels of the various channels. However, this technique suffers from several disadvantages including drift of potentiometers due to temperature variations and mechanical vibrations and the necessity for time-consuming interactive potentiometer adjustment occasioned by waiting for the human operator to form a judgment as to whether the balanced condition has been achieved. Furthermore, the resultant correction of the video signal is quite gross and imprecise. Such reliance on human intervention is not desirable in document imaging at a high rate of 200 or more documents per minute or in other industrial applications where accuracy is critical.

Another way of solving the above channel imbalance problem is by means of an image signal restoration and gain control system disclosed in U.S. Pat. No. 4,216,503, issued to Wiggins. In this system, the black and white reference signals are isolated and processed by a microprocessor in accordance with a pre-established table to obtain an offset subtraction factor and a gain multiplicand. Using these factors, offset and gain are, respectively, corrected by means of a subtractor and a multiplier.

The Wiggins system, however, suffers from several disadvantages. It requires a microprocessor and its associated circuitry which is rather complex and expensive. Second, the microprocessor must perform averaging of blocks of 16 or more white and dark signals to determine the subtraction and multiplication factors which is rather time-consuming and not suitable for high-speed and accurate image processing. Third, the microprocessor needs special software to accomplish the required functions which may have to be rewritten whenever the CCD is changed. Another disadvantage with the Wiggins system is that the subtractor and multiplier are not incorporated in a feedback loop and, accordingly, offset problems in these devices due to temperature drift, etc. are not corrected. Yet another disadvantage is that the subtractor and multiplier are quite expensive, thus rendering the overall cost of the circuit expensive.

SUMMARY OF THE INVENTION

It is a primary object of this invention to provide identical offset and gain for all channels of a multi-channel CCD activated image viewing device.

It is another object of this invention to provide an apparatus for automatic self-adjustment of the offset and gain signals of the various channels in a CCD activated image viewing device to preset offset and gain levels by utilizing the internally-generated CCD white and black signals.

Briefly, the preferred embodiment of the present invention includes for each CCD channel a gain adjust circuit and an offset adjust circuit for receiving as input the CCD signal consisting of the channel's video output and internal black and white references for adjusting, respectively, the gain and offset of the various channel outputs to desired uniform levels as required by the remainder of the apparatus. The remainder of the apparatus comprises an analog-to-digital converter for each channel to digitize the channel's video output and internal black and white references, a demultiplexer which merges all the channel outputs into a single serial digital signal, and two identical gain and offset adjustment feedback loops, the former coupled to the demultiplexer and the gain adjust circuit and the latter coupled to the demultiplexer and the offset adjust circuit. The gain/offset adjustment feedback loop consists of a digital comparator which makes an individual comparison of the channel digital white/black signal with a preset gain/offset reference signal, a pair of up/down counters (one pair per channel) connected to the comparator for generating an appropriate digital increment or decrement signal (i.e. gain/offset adjust signal) as dictated by the comparator output, and digital-to-analog converters to convert the counter signals to analog signals which, when applied to the gain adjust and offset adjust circuits, adjusts the various channel gain and offset values to the desired and uniform gain level and offset level.

DETAILED DESCRIPTION

Figure 1:
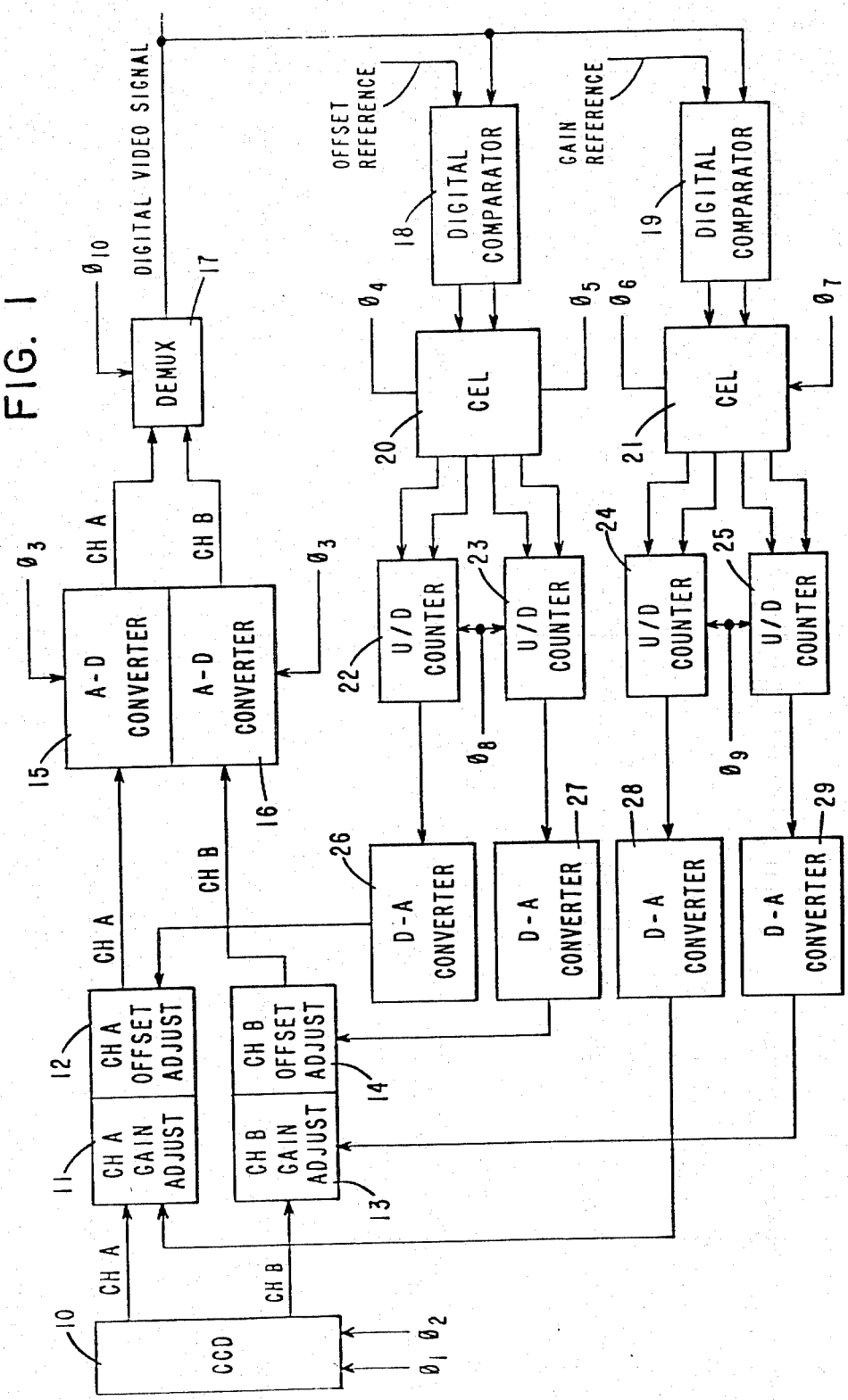
FIG. 1 is a schematic block diagram showing an example of the solid state self-adjusting video camera apparatus in accordance with the present invention.

Referring now to FIG. 1, the solid state image sensor or CCD used in the solid state self-adjusting video camera of the present invention is shown diagrammatically in this Figure generally by numeral 10. In this embodiment, the CCD 10 is used as a line-scan device, i.e. as the object to be imaged moves past the CCD camera, the CCD records the image. One suitable example of the CCD 10 is a 1024-element linear image sensor charge coupled device sold by CCD Imaging Products Division, Fairchild Camera & Instrument Corporation, Palo Alto, Calif. as Model CCD 133/143. It has internal clock drivers which produce two clock signals to shift information out of the photosensor chip. The Fairchild Model 133/143 also has internal black and white references and operates on a single power supply. CCD 10 has two output lines or channels with each of the output lines having an output from a different photosensor element thereon at a different time than the other output line. Channel A, for example, may represent the output of all the odd-numbered photosensor elements and channel B may represent the output of all the even-numbered elements on the CCD. Since each of these channel outputs contain video signals representing approximately one-half of the graphical image of the object, they need to be combined by means of a demultiplexer to obtain the full image.

The internal black and white references referred to in the previous paragraph are necessary to practice this invention and are utilized for automatic external compensation of the offset and gain characteristics of the CCD channel outputs to not only achieve a balanced condition between them but also achieve the desired characteristics. Many of the CCDs available in the market today have these white and black reference signals built into the device. The white reference represents the peak signal generated by some selected photosensor elements on the CCD which are subjected to saturation and the black reference represents the low signal generated by some selected optically masked photosensor elements. In other words, neither the black nor the white reference depend upon the external light incident upon the CCD 10.

Figure 2:
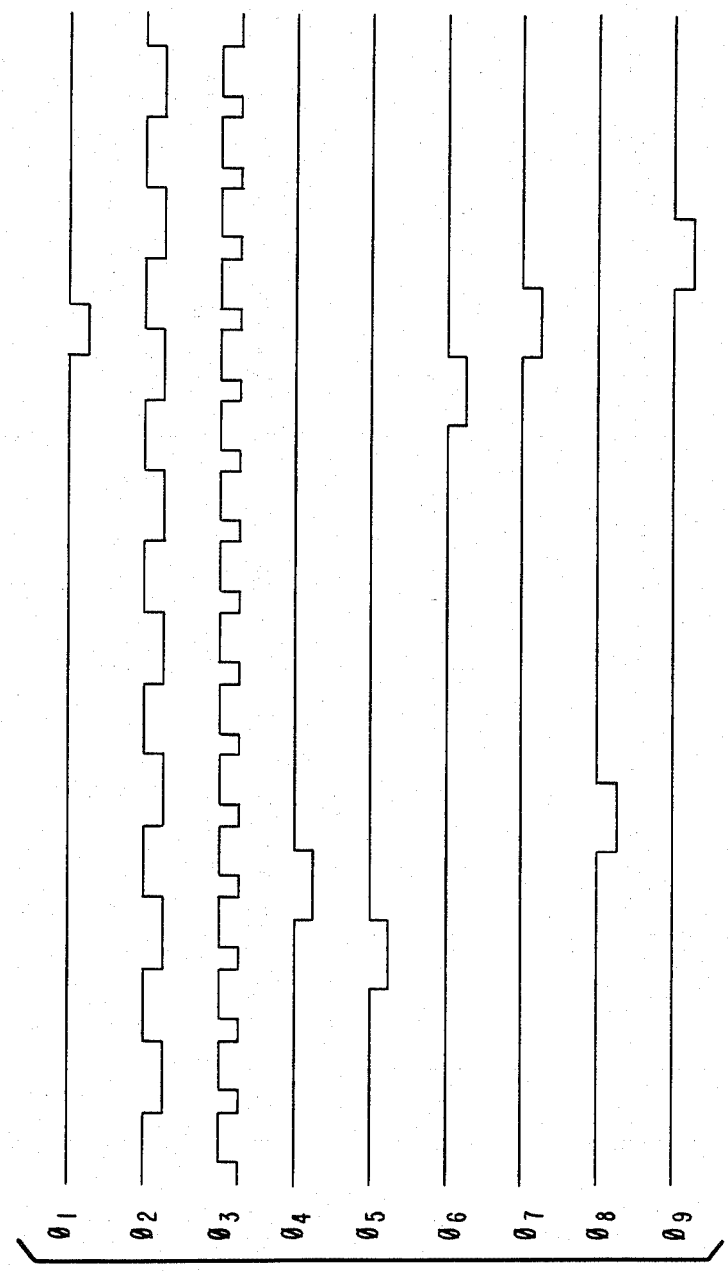
FIG. 2 is a waveform/timing diagram used to illustrate operation of the example shown in FIG. 1.

CCD 10 requires two clocks $\phi_1$ and $\phi_2$ to control it. Typical waveforms that are employed for $\phi_1$ and $\phi_2$ are shown in FIG. 2. One scan interval in FIG. 2 is about 285 microseconds in length. $\phi_1$, which is known as the transfer clock, is a once per scan clock that controls the integration time of the photosensor. $\phi_2$, which is known as the transport clock, is a square wave clock that controls the readout rate of video data from the sensor.

The channel A video output from CCD 10 (FIG. 1) thus consists of a serial DC output comprising a white reference, a black reference and the video signals from all the odd-numbered photosensor elements of the CCD. Likewise, the channel B video output from CCD 10 consists of the serial data of a white reference, a black reference and the video signal from all the even-numbered photosensor elements of the CCD. These CCD outputs serve as inputs for the remainder of the present apparatus.

To facilitate a full understanding of the manner in which the present invention accomplishes the offset and gain adjustments of the CCD channel video outputs, it is sufficient to limit the discussion to one channel since the other channel functions in a manner identical to this channel. Accordingly, in what follows the discussion will be limited, where appropriate, to channel A.

The channel A video output will pass through a gain adjust block 11 and an offset adjust block 12 where a gain adjustment and offset adjustment of the video output and the internal black and white references will take place, when and if required, as dictated by the remainder of the self-adjusting scheme of the present apparatus. Gain adjust block 11 is a variable resistance circuit which adjusts the amplitude of the white reference (measured relative to the black reference) to a predetermined value, typically, about 1 volt. Offset adjust block 12 is a variable voltage-to-current convert circuit which adjusts the position of the black reference to a predetermined value, typically, near 0 volts. Examples of the gain and offset adjust circuits contained in blocks 11 and 12 are provided elsewhere hereinbelow.

The gain adjust block 13 and offset adjust block 14 shown in FIG. 1 are the counterparts of blocks 11 and 12, respectively, which adjust the gain and offset characteristics of the CCD channel B video signal.

The apparatus shown in FIG. 1 further includes two analog-to-digital (hereafter A-D) converters 15 and 16 where the analog video signals from CCD channels A and B are separately digitized upon application of a common control signal $\phi_3$. In other words, control signal $\phi_3$, the waveform of which is shown in FIG. 2, signals the A-D converter 15/16 to digitize the voltage present at its input. One suitable A-D converter 15/16 is a flash type converter such as the TRW Part No. 1014J. Each of the converters 15 and 16 provide a 6 bit output.

The digital output from the converters 15 and 16 is applied to a digital demultiplexer 17 which combines the video signals from channels A and B in the appropriate sequence so as to provide a digital video output representative of the entire graphical image of the object. In other words, demultiplexer 17 meshes together the video output from all the odd pixels of channel A and all the even pixels of channel B into a full sequence of odd-even pixels. The demultiplexer 17 is activated by control signal which has the same waveform as $\phi_3$ (FIG. 2) except for having one-half of the frequency of $\phi_3$. One suitable example of demultiplexer 17 is a twin dial complementary single pole single throw bi-MOS digital switch sold as Model No. 74LS257 by Texas Instruments, Inc. The data output from demultiplexer 17 is, like its two inputs, a 6 bit digital data.

If the offset and gain parameters of channels A and B have the same desired values, i.e. there is no imbalance between channels A and B gain and offset values and these are identical with the desired offset and gain values, the digital output of the demultiplexer 17 does not need any adjustment and is in a condition ready for proceeding with the processing of the video data without the need for passing through the remainder of the circuits shown in FIG. 1. If an imbalance does exist between the two channel gain and offset outputs and the corresponding reference values, then appropriate gain and/or offset adjustments are (is) accomplished by the remainder of the apparatus shown in FIG. 1 consisting of two identical automatic adjustment feedback circuit loops, one loop for offset adjustment and the second loop for gain adjustment. The offset adjustment feedback loop for both CCD channels comprises the digital comparator 18, counter enable logic (hereafter CEL) block 20, two up/down (hereafter U/D) counters 22 and 23, two digital-to-analog (hereafter D-A) converters 26 and 27, and the previously-mentioned offset adjust blocks 12 and 14. Likewise, the gain adjustment feedback loop for channels A and B comprises the digital comparator 19, CEL block 21, U/D counters 24 and 25, D-A converters 28 and 29 and the previously-mentioned gain adjustment blocks 11 and 13. Since the offset and gain adjustment feedback loops are identical, a detailed discussion of these loops will be provided in connection with one loop only, for example, the offset adjustment feedback loop.

The digital comparator 18 in the offset adjustment feedback loop receives as its one input the 6 bit digital data from the demultiplexer 17 consisting of the serial data of the individual channel A and B white and black references and the merged digital video data of these two channels. As previously mentioned, these various serial data from multiplexer 17 are supplied in a continuous, periodic sequence and any portion of this serial data may be sampled for comparison purposes. The second input of comparator 18 is designated in FIG. 1 as the Offset Reference. The Offset Reference is a preselected strapped offset reference to which level the CCD channel A and B offset references are desired to be adjusted. The Offset Reference may be selected by means of switches or straps permanently mounted on the circuit board (neither of which is shown in FIG. 1). Comparator 18 compares the internal black reference values of channel A and B with the Offset Reference and generates as its output either a "<" or "=" value depending upon whether the particular channel internal black reference is greater than or equal to the Offset Reference. The ">" value of the comparator 18 output is generated by default of the "<" or "=" values.

The output of comparator 18 is supplied to CEL block 20 which is controlled by clock signals $\phi_4$ and $\phi_5$ to perform the following tasks. It causes the up/down counters 22 and 23 to pick from the comparator 18 output at the right time the internal black reference of the right channel. CEL block 20 enables a particular counter 22 or 23 and causes it to increment or decrement the count as required by the comparison outcome of comparator 18. CEL block 20 also disables the counter 22 or 23 after accomplishing the above counting. In other words, the output of CEL block 20 consists of a counter enable/disable instruction and an increment/decrement instruction which is applied to each of the appropriate up/down counters 22 or 23.

Figure 3:
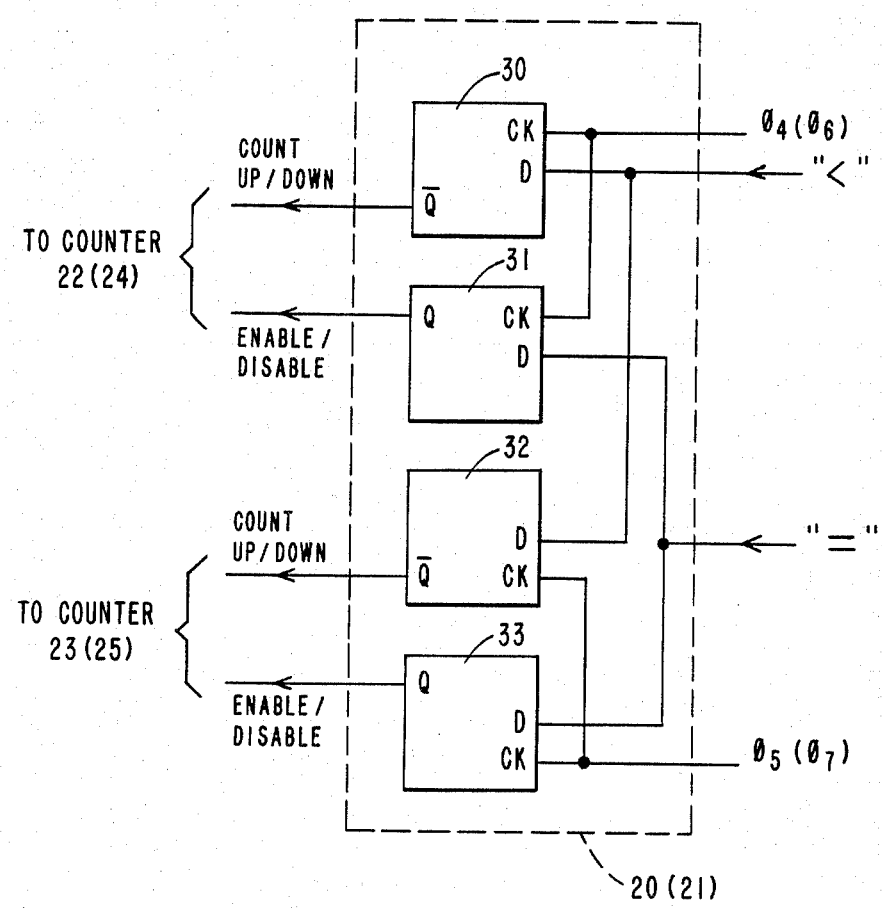
FIG. 3 is a detailed diagram schematically illustrating one example of the counter enable logic block of FIG. 1.

A suitable example of CEL block 20 is shown in FIG. 3 and consists of four D-type flip-flops 30–33 such as the industry standard LS74 devices connected in pairs as shown. The control signals $\phi_4$ and $\phi_5$ latch the internal black references of CCD channels A and B, respectively, at the appropriate times and instruct counter 22 or 23 in accordance with the outcome of the comparison of the black reference with the Offset Reference by comparator 18.

Referring to FIG. 1, depending upon the nature of the output signal (which is either a digital high or low) received from CEL block 20, counters 22 and 23 will be first enabled, then incremented or decremented and, finally, disabled after completing the necessary incrementing or decrementing or not enabled at all as when the comparator 18 indicates that the two voltages being compared therein are exactly the same. Counters 22 and 23 are prompted by clock signal $\phi_8$ (shown in FIG. 2) at the right time to accomplish the above process. Counters 22 and 23 are 10 bit counters. A 10 bit counter is selected to enhance the accuracy of the channel offset adjustment.

The 10 bit output from counters 22 and 23 is applied to a digital-to-analog (D-A) converter 26 and 27, respectively, which will provide the equivalent analog signal. The analog signals from counters 22 and 23 (which have also been referred to hereinabove as offset adjust signals) are utilized by offset adjust blocks 12 and 14 to effect the required offset adjustment in the CCD channels A and B, respectively.

Figure 4:
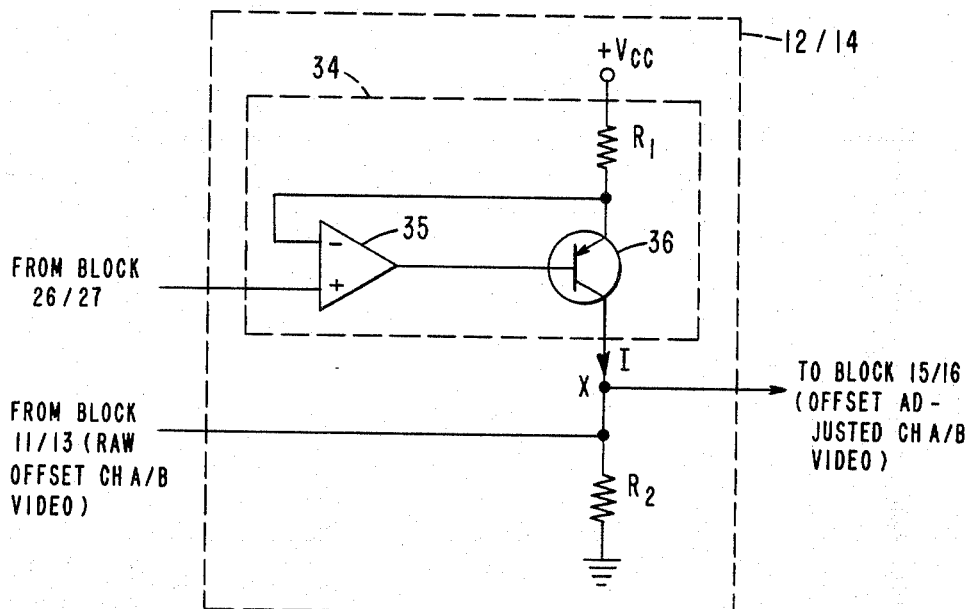
FIG. 4 is a detailed diagram schematically illustrating one example of construction of the offset adjust block shown in FIG. 1.

The offset adjust block 12 or 14, as mentioned heretofore, is a circuit consisting of a variable current source which may be assembled in a number of ways. One example of this circuit is shown in FIG. 4. This circuit uses a voltage-to-current converter 34 to convert the analog voltage supplied by block 26 or 27 into a current I. Converter 34 is constructed by means of an operational amplifier 35 of the LM324 type, a pnp transistor 36 capable of passing a few milliamps of current and a resistor $R_1$. The positive terminal of the operational amplifier 35 is coupled to the D-A converter 26/27 and the negative terminal of this amplifier is coupled to the collector of transistor 36. The value of $R_1$ is chosen to fix the range of I. The converter 34 is connected in series with a resistor $R_2$ of a fixed resistance. The adjusted offset voltage $V_{offset}$, which is tapped at point X, is given by $V_{offset}=IR_2$. By changing I as dictated by the voltage signal supplied by the appropriate D-A converter 26 or 27, the CCD channel A or B offset (black) level can be adjusted to the desired level.

The above discussion concerns the offset adjustment feedback loop of the present invention. The gain adjustment feedback loop, which is used for adjusting the white internal references of CCD channels A and B to a uniform level, effects this adjustment in a manner analogous to the offset adjustment feedback loop with the following differences. Referring to FIGS. 1-3, the digital comparator 19 receives as one input the digital video signal from the demultiplexer 17 like its counterpart 18, but its second input is a strapped Gain Reference to which level the CCD channel A and B gains are desired to be adjusted. Another difference is that counter enable logic block 21 is controlled by clock pulses $\phi_6$ and $\phi_7$ which latch the internal white reference of channels A and B, respectively, at the appropriate time and instruct up/down counters 24 and 25 in accordance with the comparison outcome of comparator 19. Likewise, a different clock pulse, $\phi_9$, is used to prompt the counters 24 and 25. Finally, the analog signals provided by D-A converters 28 and 29 (also referred to herein as gain adjust signals) are supplied to the gain adjust blocks 11 and 13, respectively, to effect the required gain adjustment in the two CCD channels.

Figure 5:
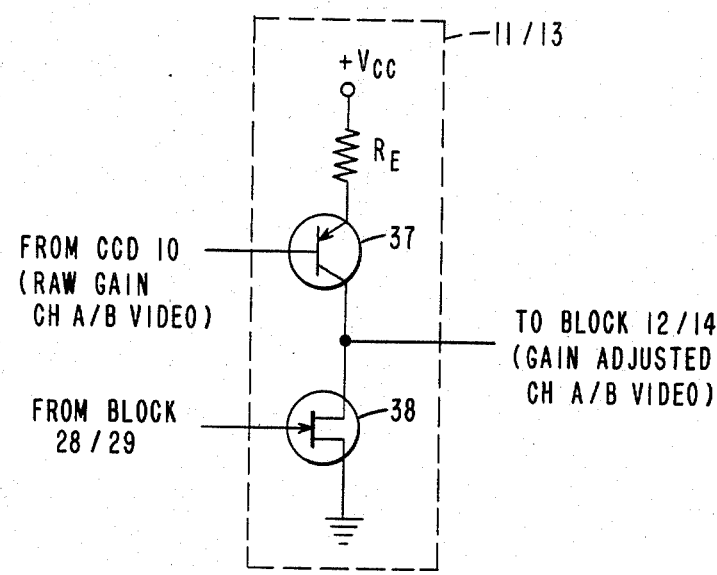
FIG. 5 is a detailed diagram schematically illustrating one example of the gain adjust block shown in FIG. 1.

The gain adjust blocks 11 and 13, as previously mentioned, are similar in construction and utilize a variable resistance circuit to accomplish the gain adjustment. One suitable example of the gain adjust circuit is shown in FIG. 5. This circuit consists of a pnp transistor 37 having a fixed resistance $R_E$ in its emitter circuit and a variable resistance $R_C$ in its collector circuit, the latter being provided by a field effect transistor (FET) 38. The transistor 37 may be of the type manufactured by Motorola as Part No. 2N3906 and the FET 38 may be Motorola Part 2N4392. The transistor 37 functions as an emitter-type amplifier whose gain is given by the resistance ratio $R_C/R_E$. The analog voltage supplied to the gate of FET 38 by D-A converter 28 or 29 will appropriately change the internal resistance of the FET 38, thus changing $R_C$. This change in $R_C$ will accordingly change the gain of the transistor 37, thereby optimally adjusting the raw or unadjusted gain of channel A or B video signals supplied to the transistor 37 to the desired gain setting.

A modification (not shown in FIG. 1) of the above described apparatus is to substitute in place of the combination, the A-D converter pair 15, 16 and the demultiplexer 17, an analog MOS switch and a single A-D converter. The analog MOS switch and the single A-D converter are activated by clock signals $\phi_{10}$ and $\phi_3$, respectively. In this modified version of the present invention the analog MOS switch merges the channel A and B analog signals in the proper sequence and the (single) A-D converter digitizes the merged data which is then available for passing through the gain adjustment and offset adjustment feedback loops.

The comparators 18 and 19 shown in FIG. 1 may be off-the-shelf chips such as Texas Instruments Inc. Part No. 74LS85.

The up/down counters 22-25 may, in the simplest form, be a cascaded bank of LS191 chips which are also off-the-shelf chips manufactured by Texas Instruments Inc.

An example of D-A converters 26-29 is Motorola Part No. MC3410.

An example of the analog MOS switch referred to hereinabove is National Semiconductor Corporation Part No. LF11331.

Operation

Having described the configuration of the self-adjusting video camera, as illustrated in the block diagram of FIG. 1, operation of the camera will now be briefly traced. An object of the image, such as a document, in the field of view of the camera is projected through an optical system (not shown) onto the linear CCD array 10. By means of clock signals $\phi_1$ and $\phi_2$ electrical analog signals proportional to the brightness of the image are generated. The channel A signal of the dual channel CCD 10 generated in this manner contains the image or video signal corresponding to all the odd picture elements of the CCD together with internal black and white references. Similarly, channel B signal of CCD 10 so generated contains the video signal corresponding to all the even pixels of the CCD along with its internal black and white references. Another way of generating the CCD 10 channel A and B signals is by not using an object at all but merely generating the internal black and white references characteristic of these channels by means of clock signals $\phi_1$ and $\phi_2$. In order to achieve the automatic offset and gain adjustments of channels A and B these internal black and white references alone are sufficient.

The analog data of channel A and B will next pass through the respective gain adjust blocks 11 and 13 and offset adjust blocks 12 and 14. These data are next individually digitized into 6 bit data by A-D converters 15 and 16 upon application of control signal $\phi_3$ thereto. The digital data is fed to a demultiplexer 17 which, when activated by the control signal $\phi_{10}$, combines the channel A and channel B data into a total video signal containing the complete image of the object. Specifically, this signal contains the serial data of the internal white and black references of channels A and B and all video data arranged in odd-even pixel format.

The multiplexed video signal is thereafter transmitted to offset adjustment and gain adjustment feedback loops for adjusting, respectively, the offset and gain characteristics of the channels. To trace the manner of achieving channel A offset adjustment, the video signals from demultiplexer 17 will go to digital comparator 18 where the channel A black reference is compared with the preset Offset Reference and the outcome of this comparison which is either the "=" or "<" value is supplied to the CEL 20. By default of the "=" and "<" values, the ">" value is also supplied to CEL block 20.

The mode of operation of CEL block 20 is as follows. Referring to FIG. 3, the "<" value is fed to the D inputs of the flip-flop pair 30 and 32 and the "=" value is fed to the D input of the flip-flop pair 31 and 33. Assume that the comparison outcome of comparator 18 is the "=" value. This value will cause the D inputs of flip-flops 31 and 33 to go high. At this moment, the clock signal $\phi_4$ is applied to the clock inputs (ck) of the flip-flop pair 30 and 31. Signal $\phi_4$ will clock the "=" value at the D input of flip-flop 31 out to the output Q of this flip-flop. Note, signal $\phi_4$ will not have any effect on flip-flop 30 since the D input of this flip-flop is not active at this moment. As a result of the above operation, the output Q of flip-flop 31 will be high, which when supplied to up/down counter 22, will not enable the counter. In other words, counter 22 will neither count up or down but will hold the count at its present value since there exists an equilibrium or balanced condition between the channel A black reference and the desired Offset Reference.

If the outcome of the comparator 18 is not the "=" value but the "<" value, then in this case the D inputs of the flip-flops 30 and 32 would be high. If now the signal $\phi_4$ is applied (to flip-flops 30 and 31) as before, this signal will latch the high value at the D input of the flip-flop 30 out rendering the $\overline{Q}$ output of this flip-flop low. Note, signal $\phi_4$ will not affect flip-flop 31 now, since the D input of this flip-flop is not active. The $\overline{Q}$ output of flip-flop 30 is next fed to up/down counter 22, which when prompted by clock signal $\phi_8$, will increment the count until the next cycle in the offset adjustment feedback loop when the "=" value is generated by the comparator 18, i.e. until the channel A black reference is equal to the Offset Reference.

The mode of operation of CEL block 20 for the third situation, namely, when the comparison outcome of comparator 18 is neither "=" or "<", is similar to the above two modes. Referring to FIG. 3, in this case the signal at "<" input of CEL block 20, i.e. the D input of flip-flops 30 and 32, will be low. When signal $\phi_4$ is applied to flip-flop 30 (and flip-flop 31), it latches in the flip-flop 30 low D input making the flip-flop 30 output at $\overline{Q}$ high. This high value, when applied to counter 22, will decrement the count therein (after being prompted by clock signal $\phi_8$) until instructed by comparator 18 via CEL block 20 to stop. At this point, counter 22 will be disabled by flip-flop 31.

Note that the "=", "<" and ">" values are continuously supplied by comparator 18 to the remainder of the offset adjustment feedback loop, but these values are latched in by clock signal $\phi_4$ selectively to accomplish the necessary balancing of the channel A black reference with the Offset Reference.

The counter 22 digital output is next passed through the D-A converter 26 where it is converted to an analog voltage signal (channel A offset adjust signal) and thereafter supplied to the offset adjust block 12 for bringing about the necessary offset adjustment of the channel A raw black reference as previously discussed.

The channel B offset adjustment is achieved in a manner similar to the above except that clock signal $\phi_5$ is used instead of signal $\phi_4$ to latch the output of comparator 18 and counter 23 (FIG. 1) to set the count in accordance with the requirements of comparator 18. The counter 23 digital output is converted to an analog signal by D-A converter 27 and (this channel B offset adjust signal) is supplied to the offset adjust block 14 for effecting the channel B black reference offset adjustment.

The channel A and B white references are adjusted for uniform gain in a manner similar to these channels' offset adjustment by using the gain adjustment feedback loop comprising the comparator 19, CEL block 21, up/down counter 24/25, the D-A converter 28/29 and gain adjust block 11/13.

Since the video signals consisting of the serial data of black and white references of both channel A and B is supplied simultaneously by the demultiplexer 17 to both feedback loops, the two channels' offset and gain adjustments may be accomplished automatically in a single cycle by effecting the gain adjustment first followed by the offset adjustment.

Although an automatic self-adjusting offset and gain adjust control circuit having two feedback loops has been described in the context of a linear array dual channel CCD, this device may be modified for use with a multi-channel output CCD by adding a corresponding number of up/down counters, D-A converters, gain adjust blocks, offset adjust blocks and selecting an appropriate CEL block to effect the offset and gain adjustment of each channel.

Likewise, for application with a single channel (e.g. channel A) output CCD the apparatus shown in FIG. 1 may be modified by eliminating the demultiplexer 17 and the circuit blocks corresponding to the second channel (say, channel B) which includes, for example, U/D counters 23 and 25, D-A converters 27 and 29, gain adjust block 13 and offset adjust block 14. In other words, in a single channel CCD application the signal from the CCD 10 is applied as input to gain adjust block 11 which thereafter passes through the offset adjust block 12, A-D converter 15, and both the offset adjustment and gain adjustment feedback loops consisting, respectively, of the digital comparator 18, CEL 20, U/D counter 22, D-A converter 26 and the digital comparator 19, CEL 21, U/D counter 24, D-A converter 28. The signals emerging from D-A converters 26 and 28 are then fed back to the offset and gain adjust blocks 12 and 11, respectively, where the necessary offset and gain adjustments of the signal may take place in accordance with the outcome of the comparison with the offset reference and gain reference that takes place in comparators 18 and 19, respectively. This gain and offset adjusted signal then passes through A-D converter 15 and is available as the output video signal for processing purposes.

It can be appreciated that while a single channel CCD is suitable for most industrial applications, a multi-channel device is preferable where high processing speed is a factor.

Finally, although the present invention has been described in the context of a document scanning apparatus, this device has widespread use as previously discussed hereinabove. In all such applications, modifications could be made of the present invention without departing from the spirit and scope thereof.

We claim:

1. A solid state imaging apparatus for receiving a plurality of input analog signals having individual white and black references and generating corresponding digital output signals having gain and offset values equivalent to a preselected gain reference and offset reference, respectively, said apparatus comprising:
   a plurality of gain adjust means each receptive of one of said input signals and responsive to a gain adjust signal for adjusting the gain of said signals to said preselected gain reference;
   a plurality of offset adjust means each connected to one of said gain adjust means and responsive to an offset adjust signal for adjusting the offset of said signals to said preselected offset reference;

a plurality of analog-to-digital converter means each coupled to said offset adjust means for digitizing said signal;

demultiplexer means coupled to said plurality of analog-to-digital converter means for merging said plurality of digitized signals and generating said digital output signals;

a plurality of gain adjustment feedback loops, one corresponding to each of said input signals, connected between said demultiplexer means and one of said gain adjust means for generating said gain adjust signals; and a plurality of offset adjustment feedback loops, one corresponding to each of said input signals, connected between said demultiplexer means and one of said offset adjust means for generating said offset adjust signal.

2. A CCD imaging apparatus for receiving a first and second analog input signal having at least individual white and black references and generating corresponding digital output signals having gain and offset values equal to a preselected gain reference and offset reference, respectively, said apparatus comprising:

first gain adjust means receptive of said first input signal and responsive to a first gain adjust signal for adjusting the gain of said first signal to said preselected gain reference;

second gain adjust means receptive of said second input signal and responsive to a second gain adjust signal for adjusting the gain of the second signal to said preselected gain reference;

first offset adjust means connected to the first gain adjust means and responsive to a first offset adjust signal for adjusting the offset of said first signal to said preselected offset reference;

second offset adjust means connected to the second gain adjust means and responsive to a second offset adjust signal for adjusting the offset of said second signal to said preselected offset reference;

first analog-to-digital converter means connected to said first offset adjust means for digitizing said first signal;

second analog-to-digital converter means connected to the second offset adjust means for digitizing said second signal;

demultiplexer means coupled to said first and second converter means for combining the first and second digitized signals into a serial data consisting of at least said black and white references;

a first offset adjustment feedback loop connected between the demultiplexer means and the first offset adjust means for generating said first offset adjust signal;

a second offset adjustment feedback loop connected between the demultiplexer means and the second offset adjust means for generating said second offset adjust signal;

a first gain adjustment feedback loop connected between the demultiplexer means and the first gain adjust means for generating said first gain adjust signal; and a second gain adjustment feedback loop connected between the demultiplexer means and the second gain adjust means for generating said second gain adjust signal.

3. The apparatus as recited in claim 2 wherein said first offset adjustment feedback loop comprises:

first digital comparator means for comparing the digitized first black reference with the preselected offset reference and generating a comparison signal of greater than, equal to, or less than;

first counter means responsive to said comparison signal for producing an output count; and first digital-to-analog means connected to said first counter means for translating said output count into the equivalent first offset adjust signal.

4. The apparatus as recited in claim 2 wherein said second offset adjustment loop comprises:

first digital comparator means for comparing the digitized first black reference with the preselected offset reference and generating a comparison signal of greater than, equal to or less than;

second counter means responsive to said comparison signal for producing an output count; and second digital-to-analog means connected to said second counter means for translating said second counter means output count into the equivalent second offset adjustment signal.

5. The apparatus of claim 2 wherein said first gain adjustment feedback loop comprises:

second digital comparator means for comparing the digitized white reference with the preselected gain reference and generating a comparison signal of greater than, equal to, or less than;

third counter means responsive to said comparison signal for producing an output count; and third digital-to-analog converter means connected to said third counter means for translating said third counter output count into the equivalent first gain adjust signal.

6. The apparatus of claim 2 wherein said second gain adjustment feedback loop comprises:

second digital comparator means for comparing the digitized white reference with the preselected gain reference and generating a comparison signal of greater than, equal to, or less than;

fourth counter means responsive to said comparison signal for producing an output count; and fourth digital-to-analog converter means connected to said fourth counter means for translating said fourth counter output count into the equivalent second gain adjust signal.

7. The apparatus as in claim 2 wherein said first and second gain adjust means are variable resistance circuits.

8. The apparatus as in claim 2 wherein said first and second offset adjust means are voltage-to-current converter circuits.

9. The apparatus of claim 3 or 4 further comprising counter enable logic means connected between said first comparator means and said first and second counter means for operating said first and second counter means.

10. The apparatus of claim 5 or 6 further comprising counter enable logic means connected between said second comparator means and said third and fourth counter means for operating said third and fourth counter means.

11. A solid state imaging apparatus comprising:

photosensitive means for generating a first analog signal consisting of at least a black reference and a white reference and a second analog signal consisting of at least a black reference and a white reference;

first gain adjust means receptive of said first analog signal from the photosensitive means and responsive to a first analog gain adjust signal for adjusting the first signal gain to equal a preselected gain reference;

second gain adjust means receptive of said second analog signal from the photosensitive means and responsive to a second analog gain adjust signal for adjusting the second signal gain to equal a preselected gain reference;

first offset adjust means connected to said first gain adjust means and responsive to a first analog offset adjust signal for adjusting the first signal offset to equal a preselected offset reference;

second offset adjust means connected to said second gain adjust means and responsive to a second analog offset adjust signal for adjusting the second signal offset to said preselected offset reference;

first analog-to-digital converter means connected to said first offset adjust means for digitizing said first signal;

second analog-to-digital converter means connected to said second offset adjust means for digitizing said second signal;

demultiplexer means coupled to said first and second converter means for merging the first and second digitized signals;

first comparator means connected to the demultiplexer means for comparing the black references of said signals with said preselected offset reference and generating a first comparison signal corresponding to the comparison of the first signal black reference with the offset reference and a second comparison signal corresponding to the comparison of the second signal black reference with the offset reference;

second comparator means connected to the demultiplexer means for comparing the white references of said signals with said preselected gain reference and generating a third comparison signal corresponding to the comparison of the first signal white reference with the gain reference and a fourth comparison signal corresponding to the comparison of the second signal white reference with the gain reference;

first counter means responsive to the first comparison signal and operative to begin counting and develop an output count;

second counter means responsive to the second comparison signal and operative to begin counting and develop an output count;

third counter means responsive to the third comparison signal and operative to begin counting and develop an output count;

fourth counter means responsive to the fourth comparison signal and operative to begin counting and develop an output count;

first digital-to-analog converter means coupled to said first counter means for producing the first analog offset adjust signal corresponding to the count in said first counter means;

second digital-to-analog converter means coupled to said second counter means for producing the second analog offset adjust signal corresponding to the count in said second counter means;

third digital-to-analog converter means coupled to said third counter means for producing the first analog gain adjust signal corresponding to the count in said third counter means; and fourth digital-to-analog converter means coupled to said fourth counter means for producing the second analog gain adjust signal corresponding to the count in said fourth counter means.

12. The apparatus of claim 11 wherein said photosensitive means is a charge coupled device.

13. The apparatus as in claim 11 further comprising:
first counter enable logic means coupled to said first comparator means and the first and second counter means for operating said first and second counter means; and
second counter enable logic means coupled to said second comparator means and the third and fourth counter means for operating said third and fourth counter means.

14. A charge coupled device (CCD) video camera interface circuit having a circuit input terminal for receiving a CCD input analog signal having a gain and an offset value and a video output terminal for outputting a CCD signal having gain and offset values equal to preselected gain reference and offset reference values, respectively, comprising:
gain adjust means connected to said circuit input for adjusting the gain of the analog signal received from said CCD;
offset adjust means connected to said gain adjust means for adjusting the offset of the CCD signal received from said gain adjust means;
analog-to-digital converter means connected to said offset adjust means for digitizing said CCD signal;
a gain adjustment feedback loop connected between the analog-to-digital converter means and said gain adjust means for effecting adjustment of the signal gain value to said preselected gain reference value; and
an offset adjustment feedback loop connected between the analog-to-digital converter means and said offset adjust means for affecting adjustment of the signal offset value to the preselected offset reference value.

15. The circuit as in claim 14, wherein said gain adjustment feedback loop comprises
digital comparator means for comparing the digitized signal with the preselected gain reference value and generating a comparison signal;
counter means responsive to said comparison signal for developing an output count; and
digital-to-analog converter means connected to said counter means for producing an analog signal equivalent to said output count.

16. The circuit as in claim 14 wherein said offset adjustment feedback loop comprises:
digital comparator means for comparing the digitized signal with the preselected offset reference value and generating a comparison signal;
counter means responsive to said comparison signal for developing an output count; and
digital-to-analog converter means connected to said counter means for producing an analog signal equivalent to said output count.

17. The circuit as set forth in claim 15 further comprising counter enable logic means connected between said comparator means and the counter means for operating said counter means.

18. The circuit as set forth in claim 16 further comprising counter enable logic means connected between said comparator means and counter means for operating said counter means.

* * * * *